A. C. Baumgart,
Lubricator.
No. 95,635.
Patented Oct. 12, 1869.

Witnesses
Gustave Dieterich
Wm. A. Morgan

Inventor
C. A. Baumgart
per Munn & Co.
Attorneys

United States Patent Office.

CARL AUGUST BAUMGART, OF ALLEGHENY CITY, PENNSYLVANIA.

Letters Patent No. 95,635, dated October 12, 1869.

IMPROVEMENT IN LUBRICATORS.

The Schedule referred to in these Letters Patent and making part of the same.

*To all whom it may concern:*

Be it known that I, CARL AUGUST BAUMGART, of Allegheny City, in the county of Allegheny, and State of Pennsylvania, have invented a new and useful Improvement in Lubricators; and I do hereby declare that the following is a full, clear, and exact description thereof, which will enable others skilled in the art to make and use the same, reference being had to the accompanying drawings, forming part of this specification.

This invention relates to a new and useful improvement in "lubricators" or "oilers," whereby they are rendered more sure in their operation; and It consists in providing a strainer in the lubricator, by which the oil or lubricating-material is cleansed before it is used; and also in two perforated tubes, one of which is adjustable, through the perforations or orifices of which the oil or other lubricating-material and the air are allowed to escape, as will be hereinafter more fully described.

Similar letters of reference indicate corresponding parts.

Figure 1:
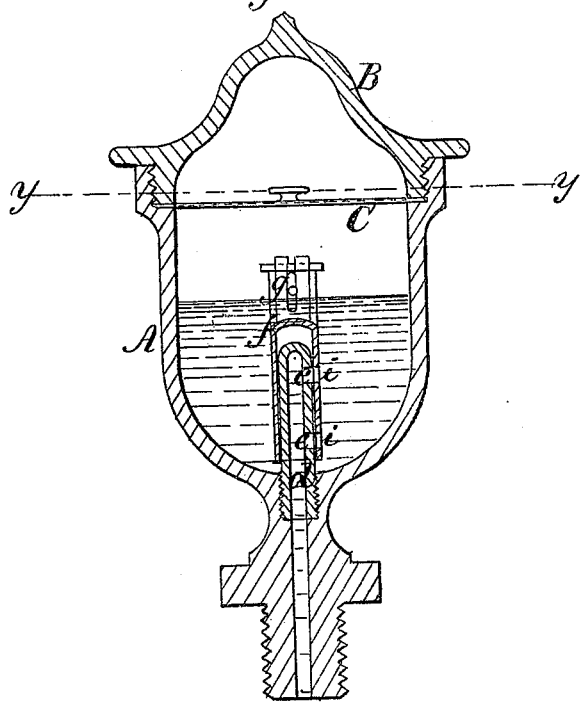
Figure 1 represents a vertical section of my improved oiler through the line $x\ x$ of fig. 2, with parts of the interior tubes broken away.
Figure 2:
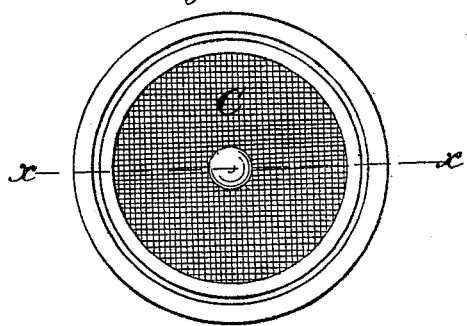
Figure 2 is a horizontal section of fig. 1, looking from the line $y\ y$, and showing the strainer.

A is the oil-vessel, which is screwed into the journal-box or above the wearing surface, and covered with the cap B in the ordinary manner; the vessel, as regards its interior and its application, being similar to many now in use.

C is the strainer or screen, made of wire gauze, or other suitable material, and secured between the cap B and the oiler, so that it may be readily removed for cleaning, as seen in the drawing.

$d$ is a tubular plug, which screws into the bottom of the vessel A, through the side of which are two orifices $e\ e$. The lower orifice is for allowing the oil or other lubricating-material to escape; the upper one is for allowing the air to escape, so that there may be a free discharge of oil.

$f$ is a tube which slides or is adjustable on the tubular plug $d$.

The lower portions of both $d$ and $f$ are shown in section, or are broken away, for the purpose of showing the oil-orifices $e\ e$ and $i\ i$.

The tube $f$ is held in position, when properly adjusted on $d$, by a set-screw which passes through the slot $g$.

$i\ i$ represent orifices through this tube, which are made to correspond with those through $d$.

By the adjustment of the tube $f$, one of the holes $e\ e$ and one of the holes $i\ i$ are made to correspond, as may be desired, for allowing a greater or less quantity of the lubricating-material to escape down through the neck of the vessel on to the wearing-surface.

The sediment and other impurities which may be combined with the oil, are retained on the strainer C, so that nothing is allowed to descend into the vessel, to clog the discharge-orifices, or prevent a sufficient supply of oil.

The orifices are or may be arranged so that the oil will be discharged drop by drop, or as rapidly as may be desired.

Having thus described my invention,

I claim as new, and desire to secure by Letters Patent—

The combination of a strainer, C, located between the cap and body of the cup, to arrest the impurities of the oil as it flows into the vessel, with a cup, A, to serve as a reservoir, to retain the oil while it is being fed to the object intended, and the tubes $d\ f$, to graduate the discharge of the said oil with greater or less rapidity, all being arranged, with respect to each other, as shown and described.

CARL AUGUST BAUMGART.

Witnesses:
   A. G. HANMANN,
   NIC. RAIBER.